United States Patent [19]

Nawata

[11] Patent Number: 4,947,451
[45] Date of Patent: Aug. 7, 1990

[54] MULTIPLE ACCESSING SATELLITE COMMUNICATION SYSTEM HAVING STANDBY CENTRAL STATION

[75] Inventor: Hizuru Nawata, Tokyo, Japan

[73] Assignee: NEC Corporation, Japan

[21] Appl. No.: 314,047

[22] Filed: Feb. 22, 1989

[30] Foreign Application Priority Data

Feb. 23, 1988 [JP] Japan .................................. 63-40426

[51] Int. Cl.$^5$ .............................................. H04B 3/36
[52] U.S. Cl. .......................................... 455/8; 455/9; 370/95.1; 370/104.1
[58] Field of Search ........................... 455/8, 9, 12, 20; 370/13.1, 95, 104, 94

[56] References Cited

U.S. PATENT DOCUMENTS 4,224,538 10/1980 Scharla-Nielson et al. ............. 455/9
4,617,674 10/1986 Mangulis et al. ...................... 370/104

*Primary Examiner*—Benedict V. Safourek
*Assistant Examiner*—Frederick R. Jorgenson
*Attorney, Agent, or Firm*—Laff, Whitesel, Conte & Saret

[57] ABSTRACT

In a satellite communication system wherein a common channel is used for communication between a central station (10) and a plurality of remote stations (12) through a satellite transponder (11), in order to avoid system down due to fault of transmission of a broadcasting signal with a timing signal by the central station (10), the central station (10) comprises two portions (13, 14) positioned at different locations and a controller (15). When the first portion (13) detects fault of transmission of the broadcasting signal during the first portion (13) operates to communicate with the remote stations (12) under transmission of the broadcasting signal, the controller (15) is notified the fault and starts the second portion (14) in place of the first portion (13) so that the communication is maintained in the system without false. Those portions (13, 14) are assigned with ID numbers and can detect the fault by detecting operation of ID number. Each of remote stations (12) has timing offset data sets corresponding to the first and second portions (13, 14), selects one of the data sets by detection of the ID number in the broadcasting signal received, and determines a slot timing for transmitting a packet signal.

6 Claims, 5 Drawing Sheets

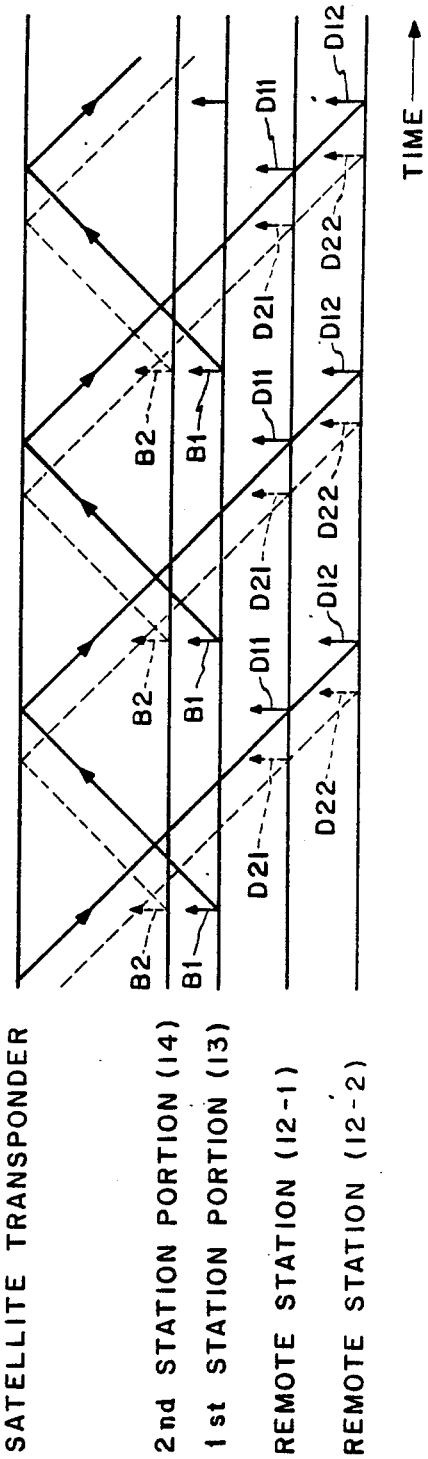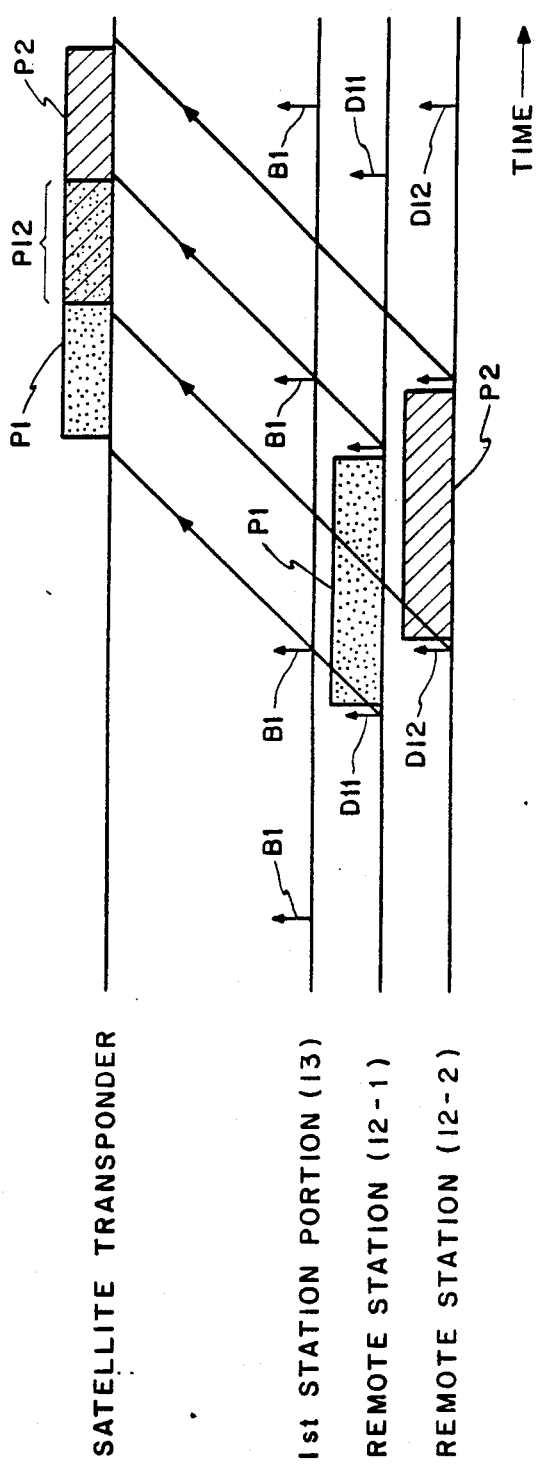

MULTIPLE ACCESSING SATELLITE COMMUNICATION SYSTEM HAVING STANDBY CENTRAL STATION

BACKGROUND OF THE INVENTION (1) Field of the Invention

The present invention relates to a time division multiple accessing satellite communication system.

(2) Description of the Prior Art

As well known in the prior art, the time division multiple accessing satellite communication system has a common communication channel interconnecting a central station and a plurality of remote stations through a satellite transponder. The common communication channel is divided into frames each having a plurality of time slots of a length. The central station transmits a broadcasting signal to the satellite transponder as a transmitted signal. The broadcasting signal has control information including a timing signal for controlling the remote stations. Each of the remote stations receives the transmitted broadcasting signal through the satellite transponder as a received broadcasting signal and derives the control information and the timing signal from the received broadcasting signal. The remote station generates a slot timing based on the derived timing signal and transmits a packet signal to one of the time slots according to the control information at the slot timing generated. A reference is made to, for example, U.S. Pat. No. 4,736,271 by Tejima et al, assigned to NEC Corporation.

The broadcasting signal from the central station is important in the multiple accessing satellite communication system. If the remote stations cannot receive the broadcasting signal due to rain or local power fault in the area where the central station is located or due to fault of a transmitter in the central station, the remote station cannot obtain the control information so that the communication cannot be effected in the system.

SUMMARY OF THE INVENTION

It is an object of the present invention to provide a multiple accessing satellite communication system which enables a central station to recover transmission of the broadcasting signal immediately after interruption of the broadcasting signal by a local fault to thereby avoid stop of communication in the system.

The present invention is applicable to a multiple accessing type satellite communication system having a common communication channel interconnecting a central station and a plurality of remote stations through a satellite transponder, the common communication channel being divided into frames each having a predetermined number of time slots, the central station transmitting a broadcasting signal having a timing signal to the remote stations, each of the remote stations receiving the broadcasting signal as a received broadcasting signal and transmitting a packet signal into one of the time slots at a slot timing based on the timing signal derived from the received broadcasting signal. According to the invention, the central station comprises: a plurality of station portions installed at different locations and having identifying numbers assigned thereto, one of the station portions being selectively permitted by an enabling signal to operate as an operating station portion to transmit the broadcasting signal; and central station control means commonly connected to the plurality of station portions for controlling the station portions to deliver the enabling signal to a specific one of the station portions, the central station control means responsive to a notifying signal from the specific station portion currently operating as the operating station portion for delivering an unable signal to the specific station portion and the enabling signal to another of the station portions. Each of the station portions comprising: identifying number generating means for generating the own one of the identifying numbers; signal generating means for generating the broadcasting signal having the timing signal and an identifying portion, the own identifying number being inserted in the identifying portion; transmitting means enabled by the enabling signal for transmitting the broadcasting signal as a transmitted broadcasting signal; receiving means for receiving a signal incoming through an antenna to produce a received signal; and fault deciding means responsive to the received signal for deciding whether or not transmission of the broadcasting signal is carried out normally to produce the notifying signal when the transmission of the broadcasting signal is decided faulty. Each of the remote stations comprises: detecting means for detecting the identifying number in the received broadcasting signal as a detected identifying number; offset generating means responsive to the detected identifying number for generating a timing offset corresponding to the detected identifying number; and slot timing generating means responsive to the timing offset for generating the slot timing determined by the derived timing signal and the timing offset.

According to an aspect of the present invention, the fault deciding means comprises: deriving means responsive to the received signal for deriving the identifying portion from the received signal as a derived portion; and deciding means responsive to the derived portion for deciding that the own identifying number is absent in the derived portion to produce the notifying signal representative of absence of the own identifying number.

BRIEF DESCRIPTION OF THE DRAWINGS

FIG. 7 is a time chart for illustrating a signal transmission delay from the central station portion to two remote stations;

FIG. 8 is a time chart for illustrating a state where packet signals transmitted from two remote stations at erroneous slot timings make radio interference at a satellite transponder.

DESCRIPTION OF THE PREFERRED EMBODIMENTS

At first, description will be made as regards general arrangement and operation of a multiple accessing satellite communication system according to an embodiment of the present invention with reference to FIGS. 1 and 2.

Figure 1:
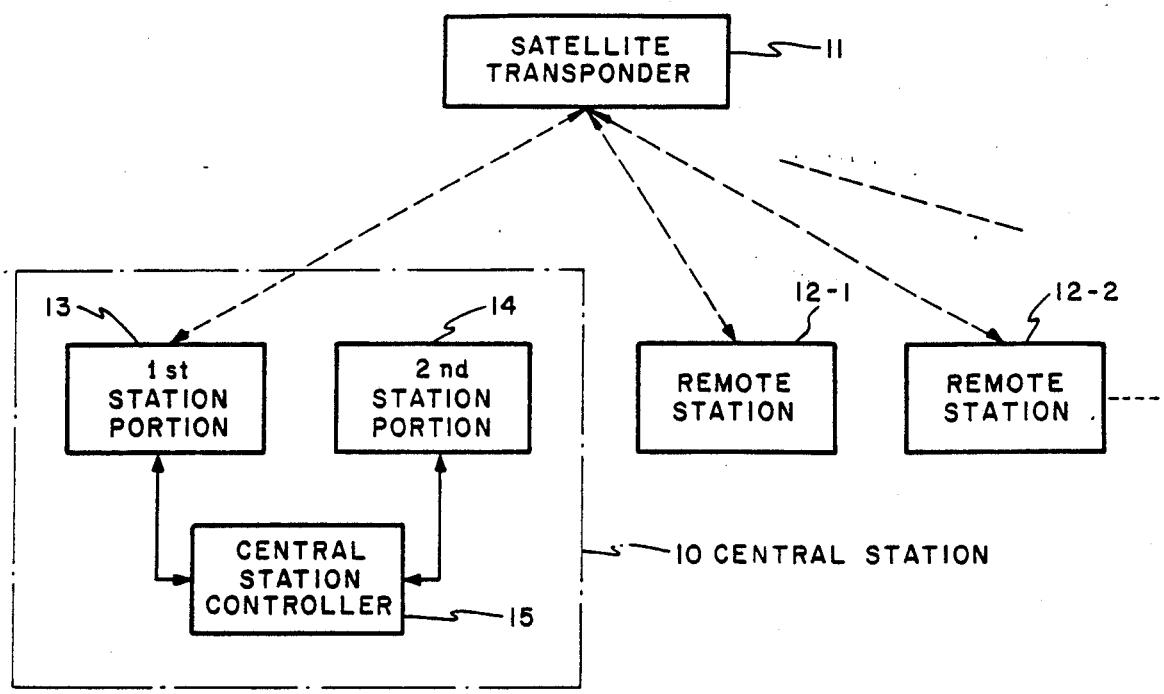
FIG. 1 is a block diagram view illustrating an operating state of a system according to an embodiment of the present invention.
Figure 2:
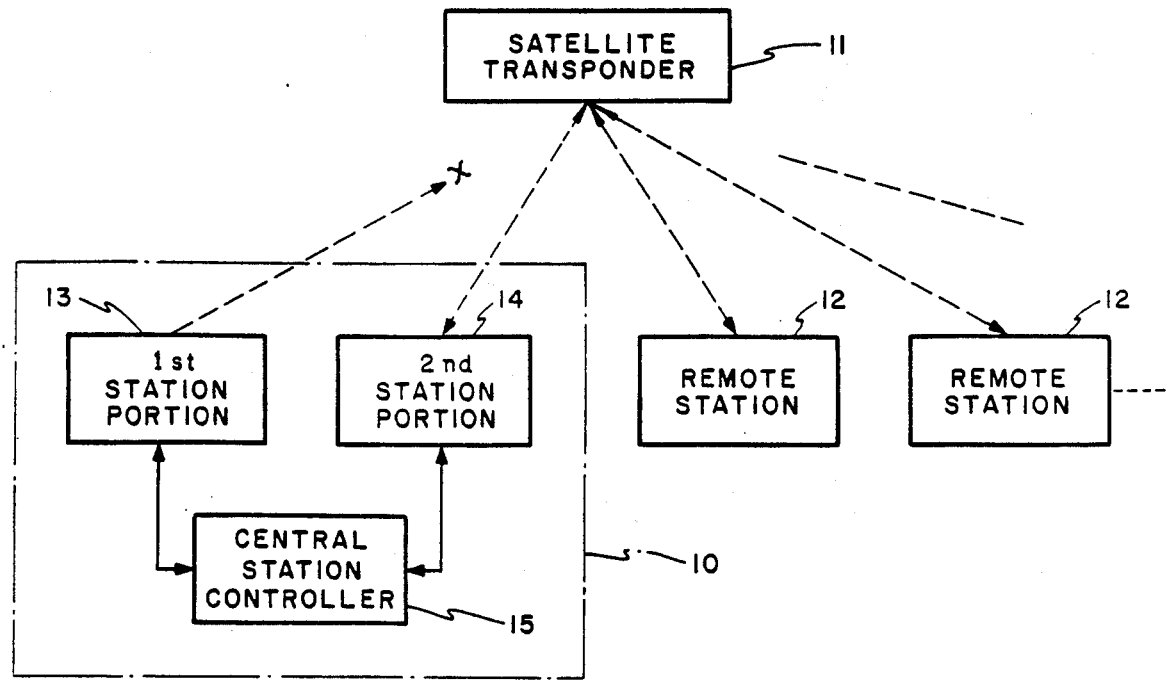
FIG. 2 is a block diagram view illustrating another operating state of the system in FIG. 1.

Referring to FIG. 1, the system shown therein comprises a central station 10, a plurality of remote stations 11, and a satellite transponder 12. The central station 10 comprises a plurality of station portions (two first and second ones are shown at 13 and 14) located at different areas on the earth, a central station controller 15 connected to the first and the second station portions 13 and 14.

The central station controller 15 is for controlling the first and second station portions 13 and 14. The central station controller 15 delivers an enabling signal to a specific one of the first and the second station portions 13 and 14 so as to make the specific station portion operate as an operating station portion. The central station controller 15 also operates as a data processor for processing data received at the operating station portion as well as preparing data to be transmitted from the operating station portion.

In the shown embodiment, the first station portion 13 receives the enabling signal and serves as the operating station portion. Accordingly, the first station portion 13 carries out communication with the plurality of remote stations 12 by use of a common communication channel through the satellite transponder 11. That is, the first station portion 13 transmits a broadcasting signal which is, in turn, received at the plurality of remote stations 12 through the satellite transponder 11. Each of the remote stations 12 transmits a packet signal at an appropriate time slot which is, in turn, received at the first station portion 13. The communicating state is shown by dashed lines in FIG. 1.

During the communication, the first station portion 13 produces a notifying signal when detecting fault of transmission of the broadcasting signal due to any reason as described above. The notifying signal is delivered to the central station controller 15. Then, the central station controller 15 produces a stop or unable signal and delivers the unable signal to the first station portion 13 and, at the same time, delivers the enabling signal to the second station portion 14. As a result, the first station portion 13 stops its operation and the second station portion 14 starts and serves as the operating station portion and performs communication with the remote stations 12, as shown by dashed lines in FIG. 2.

Figure 3:
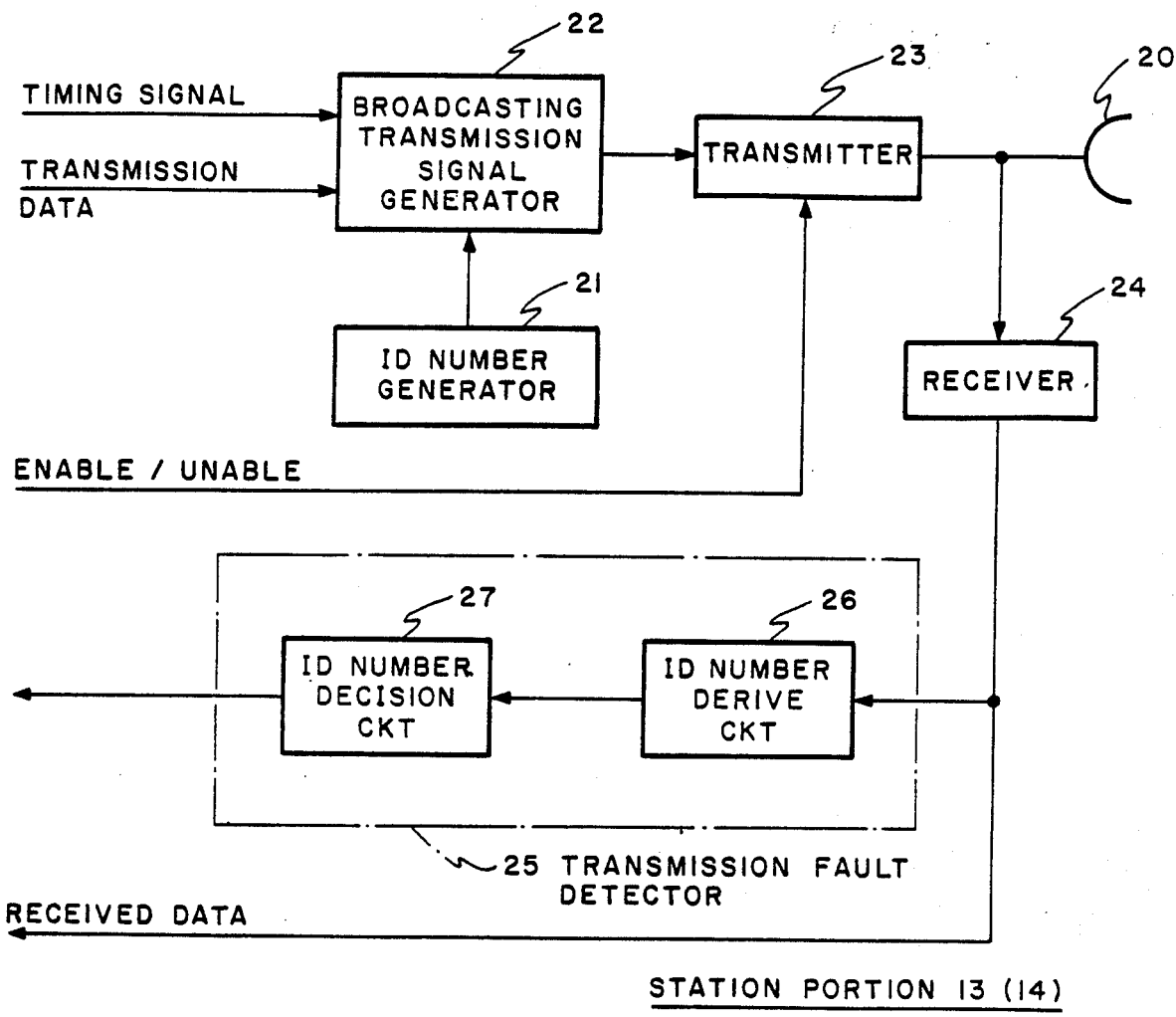
FIG. 3 is a block diagram view of each one of a plurality of station portions of a central station in the system of FIGS. 1 and 2.

Referring to FIG. 3, each of the first and the second station portions 13 and 14 comprises an antenna 20 for transmitting/receiving a radio wave to and from the satellite transponder 11, an identifying (ID) number generator 21 for generating an ID number assigned to the same station, a broadcasting transmission signal generator 22 for multiplexing the ID number and the control information including the timing signal with the data to be transmitted in the time division fashion to produce the broadcasting signal, a transmitter 23 for transmitting the broadcasting signal through the antenna 20, a receiver 24 for receiving and processing a signal incoming through the antenna 20 to produce a received signal, and a transmission fault detector 25 responsive to the received signal for detecting, during transmission of the broadcasting signal to the remote stations, whether or not the broadcasting signal is transmitted normally to inform a detected result as the notifying signal to the central station controller 15.

The transmitter 23 is enabled or unabled in response to the enabling/unable signal from the central station controller 15.

Now, description will be made as to the broadcasting signal.

As described above, the central station controller 15 supplies to the operating station portion 13 or 14 the control information including the timing signal and the data to be transmitted. In the operating station portion, the control information and the data are multiplexed with the ID number at the broadcasting signal generator 22.

Figure 4:
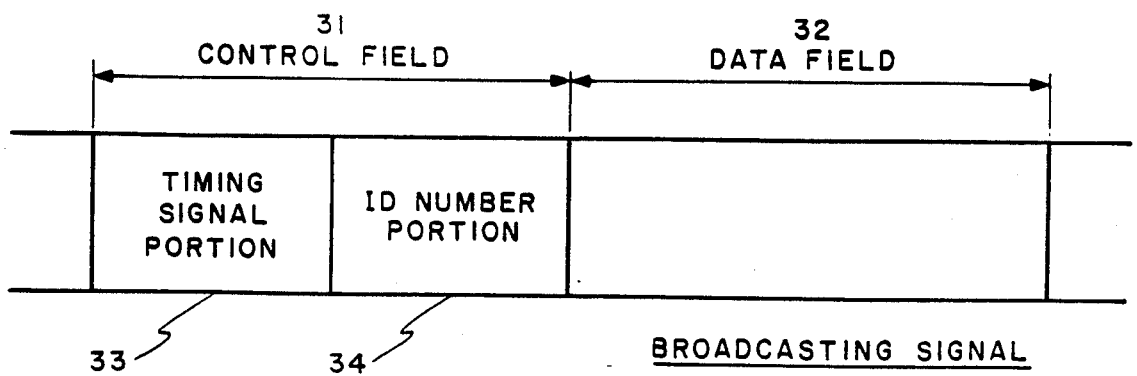
FIG. 4 is a view illustrating a format of a broadcasting signal transmitted from each of the station portions.

Referring to FIG. 4, the broadcasting signal has a format shown therein which comprises a control field 31 and the data field 32 as well known in the art. The data to be transmitted is inserted in the data field 32, while the control information and the ID number are inserted in the control field 31. In the shown embodiment, the control field 31 comprises the timing signal portion 33 and the ID number portion 34. However, the control field 31 can be provided with other portions for other control data as known in the art.

Next, description will be made as to some examples of the broadcasting fault detector 25 for deciding whether or not the broadcasting signal is transmitted normally.

Referring to FIG. 3 again, the broadcasting fault detector 25 comprises an ID number derive circuit 26 for deriving the ID number portion from the received signal and an ID number decision circuit 27 for deciding whether or not the derived ID number portion is representative of the own ID number of the own station portion.

After being transmitted from the operating station portion 13 or 14, the broadcasting signal is repeated by the satellite transponder 11 and transmitted to the remote stations 12. Then, the repeated broadcasting signal is also transmitted to the central station 10. Therefore, in the operating station portion 13 or 14, the receiver 24 receives the broadcasting signal in the signal incoming through the antenna 20. Therefore, the received signal from the receiver 24 includes the broadcasting signal which is transmitted from and then received at the same operating station portion.

The ID number derive circuit 26 derives the ID number portion 34 from the received signal and supplies the ID number to the ID number decision circuit 27. The ID number decision circuit 27 decides whether or not the supplied ID number coincides with the own ID number of the same station portion and delivers a decided signal to the central station controller 15 as the notifying signal. In other words, the broadcasting signal transmission is decided normal when the derived ID number coincides with the own ID number, while the transmission is decided false on non-coincidence.

Alternatively, the broadcasting fault detector 26 can be formed to detect fault by use of response from remote stations. In other words, the operating station portion decides its own transmission false when receiving no signal from the remote stations in response to transmission of the broadcasting signal.

In a system proposed in JP-A-61-233062, a central station transmits a broadcasting signal including a request of correspondence of each of the remote stations for monitoring each remote station. In response to the broadcasting signal, the remote stations transmit monitoring correspondence signals to different time slots. In no response from a specific one of remote stations, the central station can decide the specific remote station false.

However, it is natural that the transmission of the broadcasting signal can be considered as has been performed erroneously when no response is received from all of the remote stations. Therefore, the broadcasting fault detector 25 can be formed as a circuit for detecting no correspondence signal from all of the remote stations for the broadcasting signal.

Figure 5:
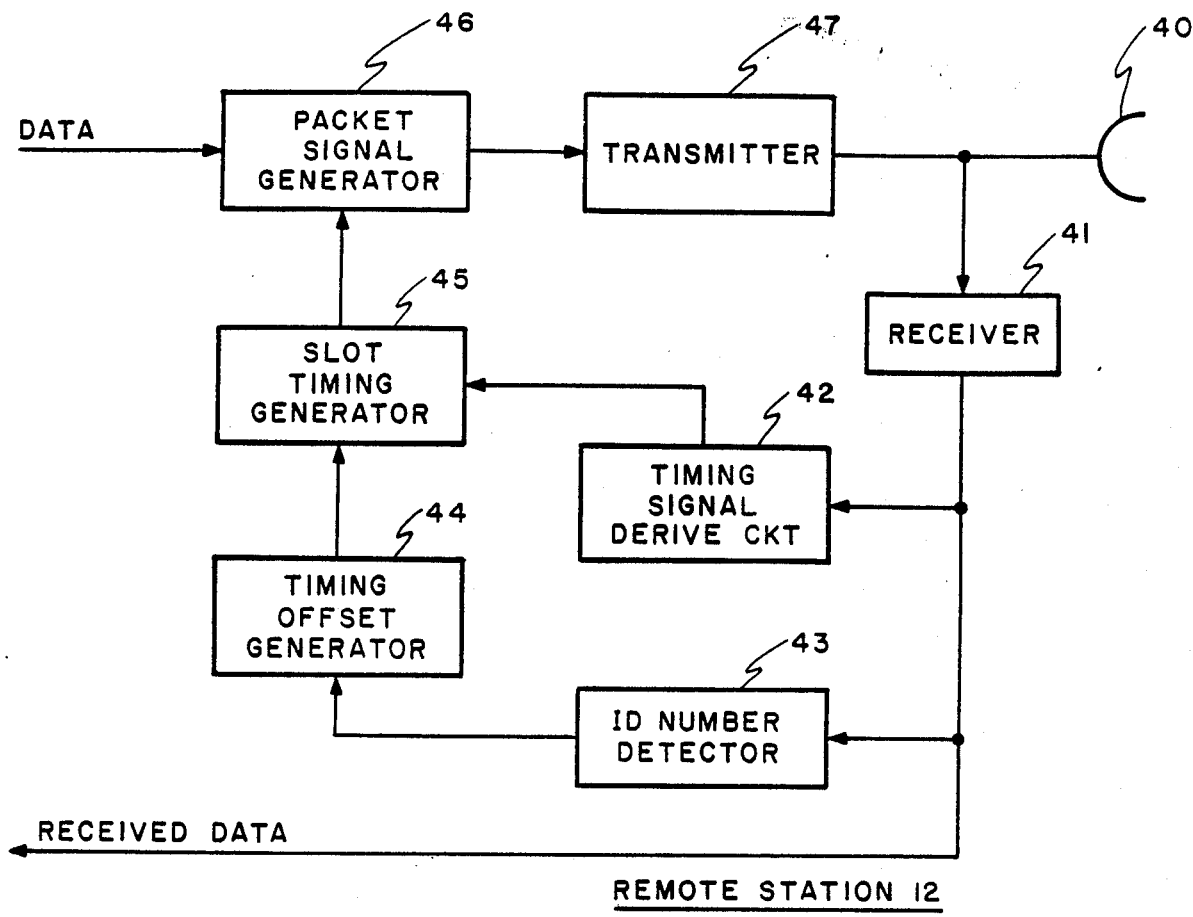
FIG. 5 is a block diagram view illustrating each one of remote stations in FIGS. 1 and 2.

Referring to FIG. 5, each of the remote stations 12 comprises an antenna 40 for transmitting/receiving a radio wave to or from the satellite transponder 11, a receiver 41 for receiving and processing the broadcasting signal which is transmitted from the operating station portion and incoming through the antenna 40 to produce a received broadcasting signal, a timing signal derive circuit 42 for deriving the timing signal from the received broadcasting signal to produce a derived timing signal, an ID number detector 43 for detecting the ID number in the received broadcasting signal to produce the detected ID number, a timing offset generator 44 for generating a timing offset corresponding to the derived ID number, and a slot timing generator 45 for generating the slot timing based on the derived timing signal and the generated timing offset.

Figure 6:
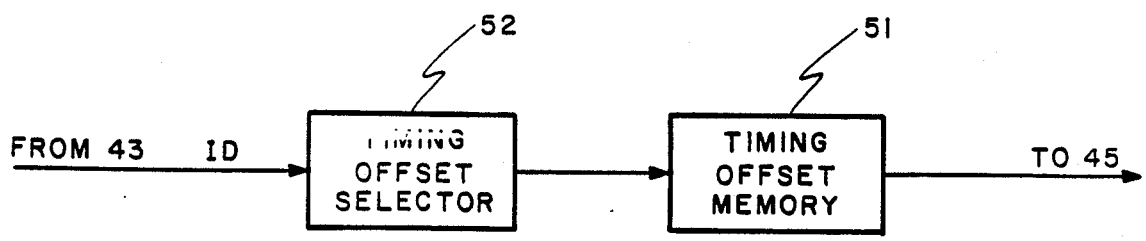
FIG. 6 is a block diagram view of a timing offset generator in FIG. 5.

Referring to FIG. 6, the timing offset generator 44 can be formed by combination of a timing offset memory 51 for memorizing a plurality of timing offset values corresponding to the station portions, respectively, and a timing offset selector 52 responsive to the detected ID number for selecting a specific one of station portions which has the detected ID number to make the timing offset memory produce a specific one of the timing offset values corresponding to the specific station portion. The specific offset value is delivered to the slot timing generator 45.

The remote station 12 further comprises a packet signal generator 46 for generating a packet signal from data or message supplied from a data terminal (not shown). The packet signal generator 46 sends out the packet signal to a transmitter 47 at the slot timing determined from the slot timing generator 45. The transmitter 47 transmits the packet signal through the antenna 40.

Now, description will be made as to operation of the remote stations with reference to FIGS. 7 through 9.

In the satellite communication system, each of the remote stations prepares at least one packet of the message of a predetermined time slot length and transmits the packet to a time slot at the slot timing. In order to determine the slot timing, each remote station derives the timing signal from the received broadcasting signal.

As well known in the satellite communication system, earth stations of the central station and the remote stations are disposed at different locations on the earth and, therefore, are different from each other in distance to the satellite transponder. Therefore, signals transmitted from the earth stations are different from each other in transmission time to the satellite transponder. Therefore, it is necessary to consider the signal transmission time from the earth stations to the satellite transponder in order to avoid a case where all of signals from the remote stations make radio interference at the satellite transponder.

FIG. 7 shows a state where remote stations 12-1 and 12-2 detect the timing signal transmitted from the operating station portion 13 or 14. Since there is a time difference between the transmission times from the satellite transponder 11 to the remote stations 12-1 and 12-2 because of distance difference, the detection time instant of the timing signal is different between the remote stations 12-1 and 12-2 for the same broadcasting signal transmission B1 or B2 from the operating station portion 13 or 14, as shown at D11 or D21 and D12 or D22. In FIG. 7, solid lines with arrows indicate a case where the first station portion 13 is the operating station portion while dashed lines with arrows indicate another case where the second station portion 14 operates as the operating station portion.

If the slot timing is prepared by direct use of the detected timing in the remote stations 12-1 and 12-2, and those remote stations transmit individual packet signals P1 and P2 to the same time slot at the prepared slot timing, those packet signals P1 and P2 are not completely superposed at the satellite transponder 11 but has a slip in time with a partial radio interference P12 as shown in FIG. 8 because of the time difference between the timing signal detection times D11 and D12 and because of the signal transmitting time difference from the remote stations 12-1 and 12-2 to the satellite transponder 11. This fact means that the slot timing is determined erroneously.

Accordingly, it is necessary in each remote station to determine the slot timing with a timing offset from the detection of the timing signal. The timing offset is determined according to the distance from the remote station itself to the satellite transponder 11.

Figure 9:
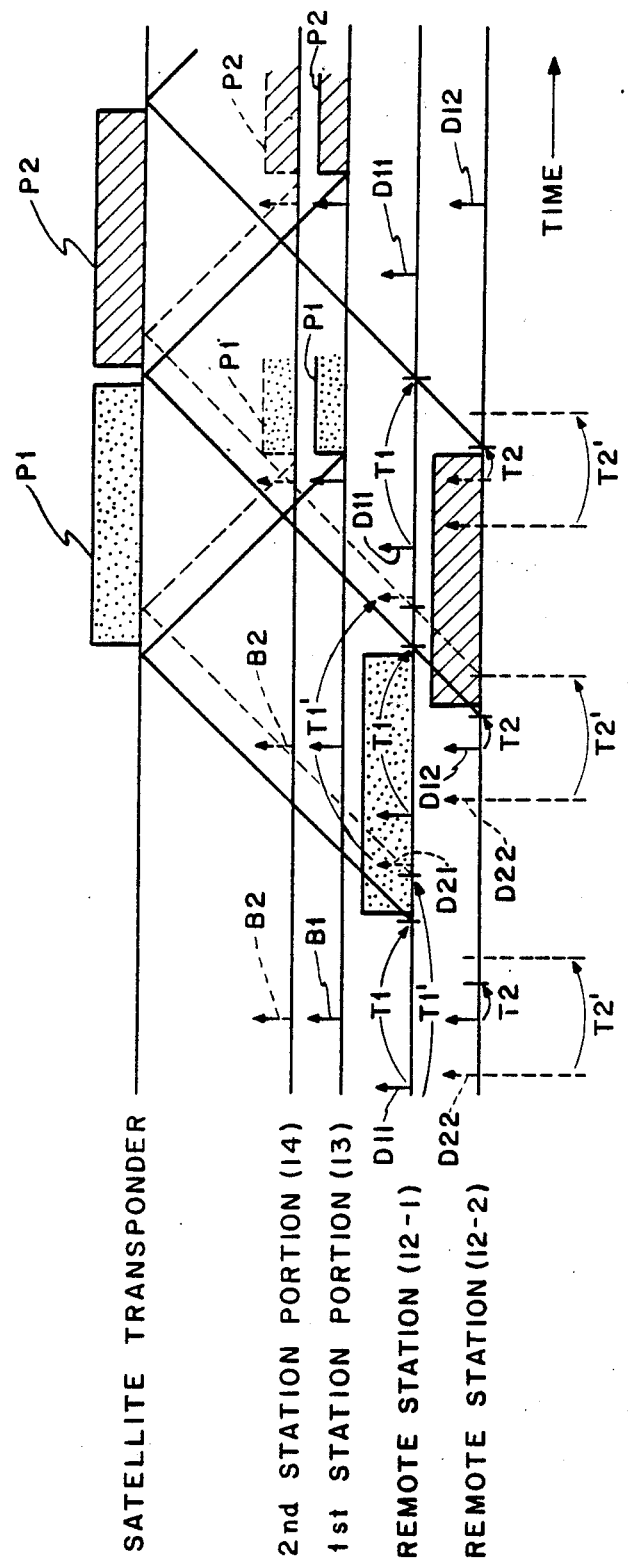
FIG. 9 is a time chart for illustrating a state of packet signals transmitted from the two remote stations at correct slot timings to the satellite transponder.

Referring to FIG. 9, the slot timing is determined by consideration of the distance difference between each remote station 12-1 and 12-2 and the satellite transponder 11. That is, the slot timing is determined with a timing offset T1 from the timing signal detection D11 in the remote station 12-1, while with another timing offset T2 from the timing signal detection D12 in the remote station 12-2. Thus, the individual packet signals P1 and P2 are transmitted into different time slots at the slot timing with the timing offset T1 and T2 from the remote stations 12-1 and 12-2, respectively. Then, the packet signals P1 and P2 are apart from each other on the time axis when arrived at the satellite transponder 11 as shown in FIG. 9. Accordingly, those packet signals are received at the first station portion 13 as shown in FIG. 9.

When the operating station portion changes from the first station portion 13 to the second station portion 14 by a certain reason as described above, the timing signal detection is also changed from D11 and D12 to D21 and D22 in both remote stations 12-1 and 12-2, respectively, as shown in FIG. 7. As a result, the slot timing is changed in each remote station so that the packet signals P1 and P2 are received at the second station portion 14 at a different timing from the previous receiving timing at the first station portion 13. This means that the data reception timing at the central station controller 15 changes. As a result, the received data can not reliably be processed at the central station controller 15.

Therefore, when the operating station portion is changed from the first station portion 13 to the second station portion 14, the timing offset values T1 and T2 are changed to T1' and T2' at the remote stations 12-1 and 12-2, respectively. Thus, the packet signals P1 and P2 are transmitted from the remote stations 12-1 and 12-2 and are received at the second station portion 14 at a timing equal to that timing at which the first station portion 13 has received the signals.

In each of the remote stations 12-1 and 12-2, the change of the timing offset is performed by the ID number detector 43, the timing offset generator 44 and the slot timing generator 45 in the manner as described above in connection with FIGS. 5 and 6.

What is claimed is:

1. A multiple accessing type satellite communication system having a common communication channel interconnecting a central station and a plurality of remote stations through a satellite transponder, said common communication channel being divided into frames each having a predetermined number of time slots, said central station transmitting a broadcasting signal having a timing signal to said remote stations, each of said remote stations receiving said broadcasting signal as a received broadcasting signal and transmitting a packet signal into one of said time slots at a slot timing based on said timing signal derived from said received broadcasting signal;

wherein said central station comprises:
a plurality of station portions installed at different locations and having indentifying numbers assigned thereto, one of said station portions being selectively permitted by an enabling signal to operate as an operating station portion to transmit said broadcasting signal; and
central station control means commonly connected to said plurality of station portions for controlling said station portions to deliver said enabling signal to a specific one of said station portions, said central station control means responsive to a notifying signal from said specific station portion currently operating as the operating station portion for delivering an unable signal to said specific station portion and said enabling signal to another of said station portions;
each of said station portions comprising:
identifying number generating means for generating the own one of said identifying numbers;
signal generating means for generating said broadcasting signal having said timing signal and an identifying portion, said own identifying number being inserted in said identifying portion;
transmitting means enabled by said enabling signal for transmitting said broadcasting signal as a transmitted broadcasting signal;
receiving means for receiving a signal incoming through an antenna to produce a received signal; and
fault deciding means responsive to said received signal for deciding whether or not transmission of said broadcasting signal is carried out normally to produce said notifying signal when the transmission of said broadcasting signal is decided faulty;
wherein each of said remote stations comprises:
detecting means for detecting said identifying number in said received broadcasting signal as a detected identifying number;
offset generating means responsive to said detected identifying number for generating a timing offset corresponding to said detected identifying number; and
slot timing generating means responsive to said timing offset for generating said slot timing determined by said derived timing signal and said timing offset.

2. A multiple accessing type satellite communication system as claimed in claim 1, wherein said fault deciding means comprises:
deriving means responsive to said received signal for deriving said identifying portion from said received signal as a derived portion; and
deciding means responsive to said derived portion for deciding that said own identifying number is absent in said derived portion to produce said notifying signal representative of absence of the own identifying number.

3. A central station for use in a multiple accessing type satellite communication system having a common communication channel interconnecting a central station and a plurality of remote stations through a satellite transponder, said common communication channel being divided into frames each having a predetermined number of time slots, said central station transmitting a broadcasting signal having a timing signal to said remote stations, each of said remote stations receiving said broadcasting signal as a received broadcasting signal and transmitting a packet signal into one of said time slots at a slot timing based on said timing signal derived from said received broadcasting signal;

wherein said central station comprises:
a plurality of station portions installed at different locations and having identifying numbers assigned thereto, one of said station portions being selectively permitted by an enabling signal to operate as an operating station portion to transmit said broadcasting signal; and
central station control means commonly connected to said plurality of station portions for controlling said station portions to deliver said enabling signal to a specific one of said station portions, said central station control means responsive to a notifying signal from said specific station portion currently operating as the operating station portion for delivering an unable signal to said specific station portion and said enabling signal to another of said station portion;
each of said station portions comprising:
identifying number generating means for generating the own one of said identifying numbers;
signal generating means for generating said broadcasting signal having said timing signal and an identifying portion, said own identifying number being inserted in said identifying portion;
transmitting means enabled by said enabling signal for transmitting said broadcasting signal as a transmitted broadcasting signal;
receiving means for receiving a signal incoming through an antenna to produce a received signal; and
fault deciding means responsive to said received signal for deciding whether or not transmission of said broadcasting signal is carried out normally to produce said notifying signal when the transmission of said broadcasting signal is decided faulty.

4. A central station as claimed in claim 3, wherein said fault deciding means comprises:
deriving means responsive to said received signal for deriving said identifying portion from said received signal as a derived portion; and
deciding means responsive to said derived portion for deciding that said own identifying number is absent in said derived portion to produce said notifying signal representative of absence of the own identifying number.

5. A remote station for use as one of a plurality of remote stations in a multiple accessing type satellite communication system having a common communication channel interconnecting a central station and said plurality of remote stations through a satellite transponder, said common communication channel being divided into frames each having a predetermined number of time slots, said central station comprising a plurality of station portions selectively operating as an operating station portion, said operating station portion transmitting a broadcasting signal having a timing signal and an identifying signal assigned thereto to said remote stations, each of said remote stations receiving said broadcasting signal as a received broadcasting signal and transmitting a packet signal into one of said time slots at a slot timing based on said timing signal derived from said received broadcasting signal;

wherein said remote stations comprises:

detecting means for detecting said identifying number in said received broadcasting signal as a detected identifying number;

offset generating means responsive to said detected identifying number for generating a timing offset corresponding to said detected identifying number; and slot timing generating means responsive to said timing offset for generating said slot timing determined by said derived timing signal and said timing offset.

6. A remote station as claimed in claim 5, wherein said offset generating means comprises:

memory means for memorizing a plurality of timing offset values corresponding to said plurality of station portions, respectively; and selecting means responsive to said detected identifying number for selecting, as a selected value, one of said plurality of timing offset values corresponding to that one of station portions which has said detected identifying number, said selecting means producing said selected value as said timing offset.

* * * * *